US 11,341,372 B2

(12) United States Patent
Hong et al.

(10) Patent No.: US 11,341,372 B2
(45) Date of Patent: May 24, 2022

(54) METHOD OF PREDICTING DEMAND OF VIRTUAL NETWORK FUNCTION RESOURCES TO WHICH MACHINE LEARNING IS APPLIED

(71) Applicant: POSTECH Research and Business Development Foundation, Pohang-si (KR)

(72) Inventors: Won Ki Hong, Pohang-si (KR); Jae Hyoung Yoo, Pohang-si (KR); Do Young Lee, Pohang-si (KR); Hee Gon Kim, Daegu (KR)

(73) Assignee: POSTECH RESEARCH AND BUSINESS DEVELOPMENT FOUNDATION, Pohang-si (KR)

( * ) Notice: Subject to any disclaimer, the term of this patent is extended or adjusted under 35 U.S.C. 154(b) by 259 days.

(21) Appl. No.: 16/691,505

(22) Filed: Nov. 21, 2019

(65) Prior Publication Data

US 2020/0167610 A1 May 28, 2020

(30) Foreign Application Priority Data

Nov. 23, 2018 (KR) .......................... 10-2018-0146500
Mar. 8, 2019 (KR) .......................... 10-2019-0026890

(51) Int. Cl.
*G06K 9/62* (2022.01)
*G06F 9/50* (2006.01)
*G06N 3/04* (2006.01)

(52) U.S. Cl.
CPC ......... *G06K 9/6262* (2013.01); *G06F 9/5077* (2013.01); *G06K 9/6257* (2013.01); *G06N 3/049* (2013.01)

(58) Field of Classification Search
CPC .. G06K 9/6262; G06K 9/6257; G06K 9/6273; G06F 9/5077; G06F 2209/5019; G06N 3/049; G06N 3/0445; G06N 3/084
See application file for complete search history.

(56) References Cited

U.S. PATENT DOCUMENTS

2017/0126792 A1* 5/2017 Halpern ................. G06N 20/00

OTHER PUBLICATIONS

Effective LSTMs, Tang et al, 2016; https://arxiv.org/pdf/1512.01100.pdf (Year: 2016).*

(Continued)

*Primary Examiner* — Jianxun Yang
(74) *Attorney, Agent, or Firm* — Morgan, Lewis & Bockius LLP

(57) ABSTRACT

The present invention relates to a technique in which demand prediction of resources of virtual network functions (VNFs) that provide a core technology in a network virtualization environment is performed using machine learning technology. In the present invention, in order to predict VNF resource information, not only are the resources of the VNFs as data but also information of surrounding VNFs that are directly or indirectly related are used, and prediction is possible even in a dynamically changed network environment. In addition, service function chain (SFC) data among various pieces of network information is used to reduce a time required for machine learning according to a size of an entire network.

9 Claims, 6 Drawing Sheets

(56) References Cited

OTHER PUBLICATIONS

Tang et al., "Effective LSTMs for Target-Dependent Sentiment Classification", Proceedings of COLING 2016, the 26th International Conference on Computational Linguistics: Technical Papers, Sep. 29, 2016, 10 pages.

Kim et al., "Machine Learning-Based Method for Prediction of Virtual Network Function Resource Demands", 2019 IEEE Conference on Network Sotfwarization (NetSoft), Jun. 24-28, 2019, pp. 405-413.

Kim et al., "A Deep Learning Approach to VNF Resource Prediction using Correlation between VNFS", 2019 IEEE Conference on Network Sotfwarization (NetSoft), Jun. 24-28, 2019, 2019, pp. 444-449.

\* cited by examiner

METHOD OF PREDICTING DEMAND OF VIRTUAL NETWORK FUNCTION RESOURCES TO WHICH MACHINE LEARNING IS APPLIED

CLAIM FOR PRIORITY

This application claims priority to Korean Patent Application No. 10-2018-0146500 filed on Nov. 23, 2018 and No. 10-2019-0026890 field on Mar. 8, 2019 in the Korean Intellectual Property Office (KIPO), the entire contents of which are hereby incorporated by reference.

BACKGROUND

1. Technical Field

Example embodiments of the present invention relate to a technique for predicting resources of virtual network functions, and more specifically, to a method of predicting demand of virtual network function resources to which machine learning is applied, in which various machine learning techniques are used so that demand for virtual network function resources is predicted from resource information of a service function chain.

2. Related Art

Network management according to the related art is entirely dependent on a person's judgment and thus professional operation and management personnel with expertise in network management are required. Therefore, there are problems in that it costs a great deal of money to maintain the professional operation and management personnel and more expertise and costs are required as the network becomes more complex.

Recently, in order to address the problems, many attempts are being made to automate operation and management by introducing machine learning technology to network management. The most important part of the network management is efficient management of network resources, which results in an issue of accurately predicting and managing demand for resources of various virtual network functions (VNFs) used to provide services in a virtual network. Currently, a technique for predicting demand for resources of VNFs using machine learning in an early stage and thus there is a problem in that accuracy of the prediction is not high. It is determined that this is because the overall knowledge in which machine learning is applied in the prediction of the VNFs is still lacking and information used to predict the demand for the resources of the VNFs and a machine learning model applied to the prediction are not appropriate.

The conventional technique proposed for predicting demand for resources of a network includes a technique for using resource information of an individual VNF. However, in the conventional technique, environmental information including information of other surrounding VNFs or overall network information is not considered and thus the accuracy is low, and when a dynamic change in environment occurs in which a new VNF is added to the network or the existing VNF is removed, the resource information of each VNF should be recollected and relearned.

In addition, in the conventional technique, since the resource information of each VNF is used to predict demand for the network resources, as many machine learning models as the number of VNFs are needed.

SUMMARY

Accordingly, example embodiments of the present invention are provided to substantially obviate one or more problems due to limitations and disadvantages of the related art.

Example embodiments of the present invention provide a technique in which data for a service function chain (SFC) is used and a new model is used to address the machine learning problems in order to implement a virtual network function (VNF) resource prediction model based on machine learning with high accuracy in a virtualized network environment.

Example embodiments of the present invention also provide a technique in which demand prediction of resources of an individual VNF is performed using machine learning on the basis of detailed resource data of other VNFs forming an SFC and labeling data is used for demand prediction of resources of a target VNF.

Example embodiments of the present invention also provide a technique in which network configuration and management functions, such as VNF auto scaling, VNF deployment, VNF migration, a VNF SFC, and the like may be performed using machine learning by accurately predicting demand for resources of VNFs.

In some example embodiments, a method of predicting demand of virtual network function (VNF) resources to which machine learning is applied, which includes (a) a step of defining feature data representing features of data to be used for machine learning and applying a long short term memory (LSTM) as a model of the machine learning, (b) a step of defining a target dependent LSTM model in which different types of data are input into the LSTM according to a target and performing attention learning for learning at least one piece of data affecting a learning model result among all feature data sets, (c) a step of learning an association between at least one piece of data and a target VNF using aspect embedding during the attention learning, (d) a step of additionally using auxiliary data in addition to main data when resource information of the target VNF is predicted based on resource information of a plurality of VNFs in a service function chain (SFC), and (e) a step of generating a final result value by combining a result value obtained by attention with a result value obtained from a last LSTM cell, among result values of the resource prediction obtained using a series of learning processes.

BRIEF DESCRIPTION OF DRAWINGS

Example embodiments of the present invention will become more apparent by describing example embodiments of the present invention in detail with reference to the accompanying drawings, in which.

DESCRIPTION OF EXAMPLE EMBODIMENTS

Figure 1:
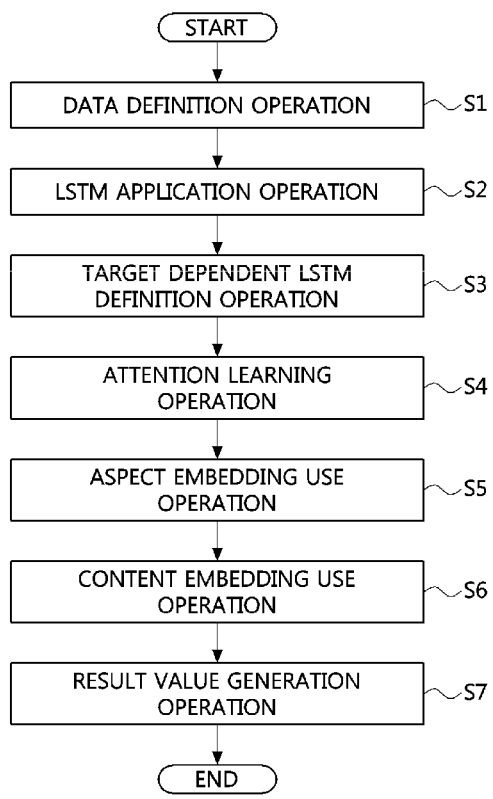
FIG. 1 is a flowchart of a method of predicting demand of resources of virtual network functions (VNFs) to which machine learning is applied according to an example embodiment of the present invention.

While the present invention is susceptible to various modifications and alternative forms, specific embodiments thereof are shown by way of example in the drawings and will herein be described in detail. It should be understood, however, that there is no intent to limit the present invention to the particular forms disclosed, but on the contrary, the present invention is to cover all modifications, equivalents, and alternatives falling within the spirit and scope of the present invention. Like numbers refer to like elements throughout the description of the figures.

It will be understood that, although the terms "first," "second," etc. may be used herein to describe various elements, these elements should not be limited by these terms. These terms are only used to distinguish one element from another. For example, a first element could be termed a second element, and, similarly, a second element could be termed a first element, without departing from the scope of the present invention. As used herein, the term "and/or" includes any one or any combination of the plurality of associated listed items.

It will be understood that when an element is referred to as being "connected" or "coupled" to another element, it can be directly connected or coupled to another element or intervening elements may be present. In contrast, when an element is referred to as being "directly connected" or "directly coupled" to another element, there are no intervening elements present.

The terminology used herein is for the purpose of describing particular embodiments only and is not intended to be limiting of the present invention. As used herein, the singular forms "a," and "an" are intended to include the plural forms as well, unless the context clearly indicates otherwise. It will be further understood that the terms "comprise," "comprising," "include," and/or "including," when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Network virtualization technology is technology in which a virtual network is generated for each of a plurality of users on a physical network infrastructure used in common and thus is used independently. Network virtualization may be implemented in various ways, but recently, many studies are being conducted to realize network virtualization by utilizing a software defined networking (SDN) paradigm.

SDN may be one step forward from the conventional hardware-based networking approach and allow an administrator to program the network itself and may provide benefits of agility, elasticity, and flexibility in a dynamic network environment on the basis of the above fact.

In the present invention, machine learning is used to accurately predict and manage demand for resources of various VNFs used to provide services in a virtual network. Here, the machine learning refers to a method in which computer software can address problems by self-learning a given environment based on data without human help, and is largely classified into supervised learning, unsupervised learning, and reinforcement learning. Recently, in the machine learning, deep learning techniques, which are similar to human judgment by abstraction using various nonlinear transformation techniques, have been applied to the supervised learning, the unsupervised learning, and the reinforcement learning, thereby significantly improving performance.

In the network virtualization technology, costs of building a network for each user may be reduced by sharing physical network resources, and a network administrator may dynamically change a configuration of the network according to a purpose of use.

However, in the network virtualization technology, even when the network management may be handled dynamically, a process of direct determination and management by a human is the same and incurs time costs so that benefits of the network virtualization are not maximized.

Recently, in order to address such a problem, there is an attempt to develop a technique in which a network learns by itself and dynamically handles management without human help by introducing the machine learning technology.

A main and essential issue in virtual network management is optimizing resource management.

In a virtual network environment, devices that provide services are referred to as virtual network functions (VNFs), and the case in which multiple VNFs are sequentially connected to handle one service is referred to as a service function chain (SFC). The resource management optimization problem is to dynamically allocate appropriate resources by estimating demand for resources of VNFs in such an SFC environment, which aims to reduce network operation costs while preventing service interruption.

The present invention relates to a method of effectively predicting demand of resources of each VNF from resource information of an SFC using various machine learning techniques.

In the present invention, a content and aspect embedding attentive target dependent long short-term memory (CAT-LSTM) method is proposed in which a structure of an LSTM, which is a type of recurrent neural network (RNN) widely used in machine learning, is changed using attention and embedding techniques. Using this model, the accuracy of the demand prediction of VNF resources may be increased and the time spent learning may be reduced.

In the present invention, a feature is proposed in which machine learning is applied to predict demand for resources of VNFs which provides a core technology in a network virtualization environment. More specifically, in the present invention, an overall process for predicting of the VNF resources using machine learning and a new optimized model are proposed.

Hereinafter, exemplary embodiments of the invention will be described in more detail with reference to the accompanying drawings. In order to facilitate overall understanding of the invention, like reference numerals in the drawings denote like elements, and thus the description thereof will not be repeated. Hereinafter, the exemplary embodiments of the present invention will be described in detail with reference to the accompanying drawings.

FIG. 1 is a flowchart of a method of predicting demand of resources of VNFs to which machine learning is applied according to an example embodiment of the present invention.

Referring to FIG. 1, the method of predicting demand of the resources of the VNFs to which machine learning is applied according to the present invention includes classifying and defining feature data to be used for the machine learning (S1), applying an LSTM as a model of the machine learning (S2), defining a target dependent LSTM model (S3), learning by assigning an attention parameter to the feature data (S4), learning which VNF is closely related to a target VNF while performing attention learning (S5), additionally using auxiliary data in addition to main data when resource information of the target VNF is predicted based on resource information of VNFs in an SFC (S6), and generating a final result value by combining a result value obtained by the attention with a result value obtained from a last LSTM cell among result values of the resource prediction obtained by the learning process (S7).

Figure 3:
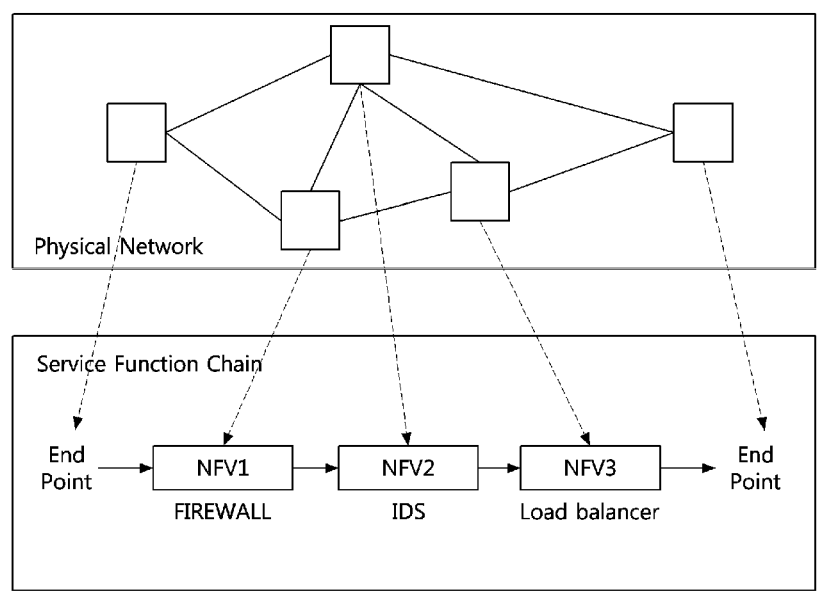
FIG. 3 is an image showing a service function chain (SFC) in a VNF environment according to an example embodiment of the present invention.

In the present invention, in order to accurately predict demand for the resources of the VNFs, data of the SFC is also used instead of considering only one piece of data of the VNF. The VNFs are deployed on a virtual machine (VM) by implementing functions of the existing network devices in software in a virtual network environment. As shown in FIG. 3 to be described below, the VNFs do not act as one function, and several VNFs are sequentially connected as one SFC to provide a service. The VNFs that constitute the SFC are connected to several VNFs in order to provide one service. Because of the above feature, the VNFs affect each other's resources and operating states.

The data definition operation S1 is an operation of classifying and defining feature data representing features of data to be used for the machine learning. The data definition operation S1 will be described below in detail with reference to FIGS. 2 to 4.

Figure 2:
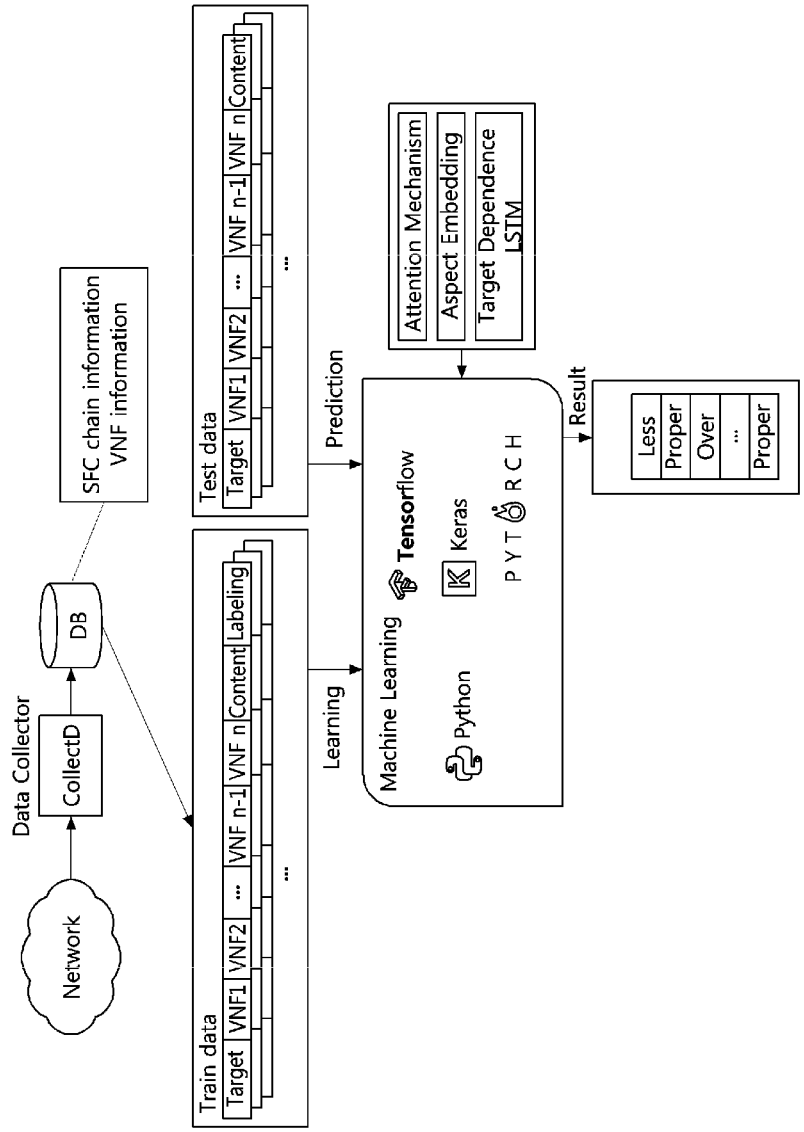
FIG. 2 is an image showing a data flow of a method of predicting demand of resources of VNFs to which machine learning is applied according to an example embodiment of the present invention.

FIG. 2 is an image showing a data flow of the method of predicting demand of the resources of the VNFs to which machine learning is applied according to the example embodiment of the present invention.

Referring to FIG. 2, in the present invention, using machine learning, supervised learning may be performed using feature data representing features of data and labeling data used as a classification criterion (correct answer) for the data.

More specifically, in the present invention, by receiving the feature data and the labeling data and then performing the machine learning to identify a relationship between the feature data and the labeling data, a corresponding labeling value may be generated as a result value when new feature data is received as an input value.

In the conventional technique in which supervised learning is used for the VNF resource demand prediction, an RNN and pieces of time series data for each VNF are used for learning.

Meanwhile, in the present invention, an RNN and data which connect a plurality of VNFs constituting an SFC are used for learning. Such a process may be a preprocessing process for using a target dependent LSTM (TD-LSTM) which will be described below.

FIG. 3 is an image showing an SFC in a VNF environment according to the example embodiment of the present invention.

Referring to FIG. 3, feature data includes an SFC in which a plurality of VNFs are sequentially connected to handle one service. Here, the SFC may include various types of functions such as a firewall, an intrusion detection system (IDS), a load balancer, and the like.

Further, the feature data includes network state information and resource state information between individual VNFs in the SFC and information of a VM in which the VNFs are installed.

Figure 4:
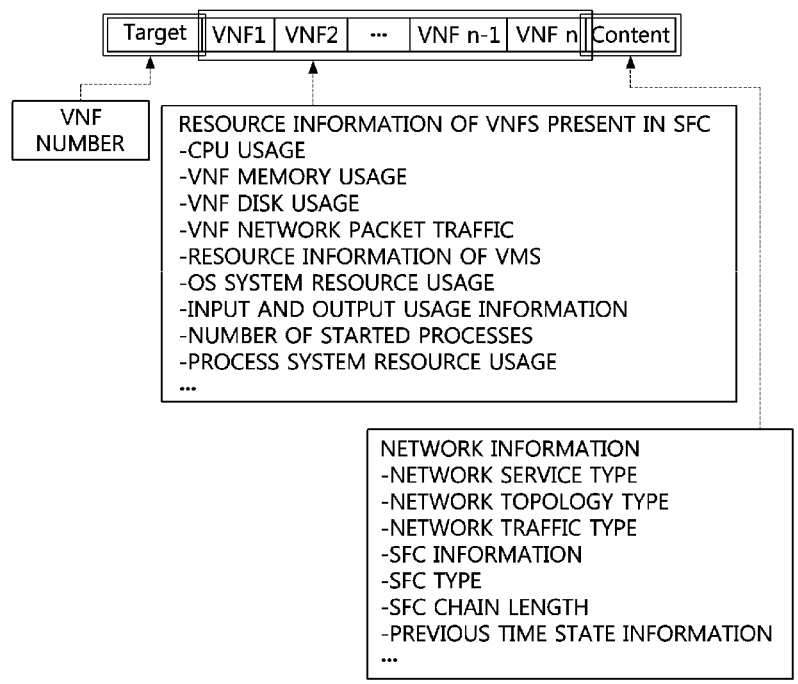
FIG. 4 is a diagram of a format of feature data according to an example embodiment of the present invention.

FIG. 4 is a diagram of a format of feature data according to an example embodiment of the present invention.

Referring to FIG. 4 and Table 1 below, the feature data may be defined by being classified into three types of data, namely, target data, VNF data, and content data.

TABLE 1

| Data | Contents of Use | Detailed Contents |
| --- | --- | --- |
| Target | Aspect embedding (Attention Layer) LSTM separation (Target dependence) | Unique number of VNF for which resource prediction is to be made (each VNF has a unique number that does not overlap) |
| VNF | LSTM input value | Resource information of VNFs present in SFC CPU usage VNF memory usage VNF disk usage VNF network packet traffic Resource information of VMs OS system resource usage input and output usage information number of started processes process system resource usage etc. |
| Content | Content embedding (LSTM input value) | Network information network service type network topology type network traffic type SFC information SFC type SFC chain length previous time state information etc. |

More specifically, the target data has a unique number of a target VNF, and the VNF data includes the VNF resource information including CPU usage, memory usage, disk usage, and network packet traffic of each VNF and VM resource information including OS system resource usage, input and output usage information, the number of started processes, process system resource usage, and the like. Here, the VNF resource information and the VM resource information may include on how much system resources are allocated to each VNF and how and how much of the allocated resources are consumed. Further, the content data has network information and SFC information, the network information has information of a type, a topology type, and a traffic type of a current network service, and the SFC information has a type and chain length of the SFC and a state information at a previous time.

In the machine learning according to the present invention, the supervised learning is performed using relationship information of the network without relying on data for each time, but the SFC resource information or the VNF resource information at the previous time is included in the content data and thus performance may be additionally improved.

In the present invention, labeling data is provided in the form of a qualitative indicator and quantitative indicator.

In an example embodiment, the labeling data may provide determination information about a state of a resource as a qualitative indicator. For example, the determination information provides insufficient, proper, or excess information. Accordingly, the state of the resource, which is a result value of machine learning, is classified into an insufficient state, a proper state, and an excess state and returned, and thus the labeling data may be easily applied to a network management module such as VNF migration, VNF distribution, and the like as compared to the conventional technique for returning specific resource state data of the VNF.

In particular, the labeling data in the present invention, which is provided as the qualitative indicator, may effectively transfer the information when a state of a problem caused by lack of resource usage management is displayed or when the resource usage may not be explained only using the quantitative numerical values of the individual VNFs.

According to another example embodiment, the labeling data provides the state information of the resource as a quantitative indicator.

In other words, the quantitative indicator of the labeling data of the present invention expresses actual resource usage for each VNF as a numerical value and may solve the issue of generation of a boundary value, which is a problem of the qualitative indicator.

More specifically, the labeling data expressed as the quantitative indicator may be classified more precisely by expressing a boundary value between two states generated when classifying the state of network resource as a specific value, and detailed usage numerical information may be provided.

Data to be used in the machine learning of the present invention is as shown in the above Table 1, and the data includes overall VNF resource information of the SFC to which the target VNF belongs, content data to be used as additional information, a unique number of a target VNF, and a labeling value.

Further, the input data to be used in the machine learning is collected using a program such as CollectD in the network environment, and a preprocessing process is performed on the input data in order to adjust lost values or error values before being used in the machine learning. In this process, the user may set additional detailed conditions by placing arbitrary restrictions on the length or unique information of the SFC to be learned, and the machine learning may be used to learn all the SFCs or only some SFCs according to the conditions.

Referring to FIG. 2 again, in the whole learning, two types of data sets, such as a train set and a test set, are required. The train set is used for a model to learn, and the test set is used to calculate the accuracy by being actually applied to the model. The train set is a set of all the data mentioned above and the test set generates a labeling value as a result value used by all the data except the labeling value. In order to avoid an overfitting problem for each of the sets, a dropout for discarding some data values is used, and a value of 0.9 is equally assigned so that 10% of data values are not used. In the present invention, gradient learning is performed in units of 64 data sets using mini-batch, which is a method of using only some pieces of all data in one learning iteration, without using full-batch, which is a method of using all data in one learning iteration for the data set.

The LSTM application operation S2 is an operation of applying an LSTM as a model of machine learning, which is an operation of applying an LSTM having a form in which a cell state is added to a hidden state of an RNN in order to overcome the disadvantages of the RNN. The LSTM application operation S2 will be described below in more detail with reference to FIG. 5.

Figure 5:
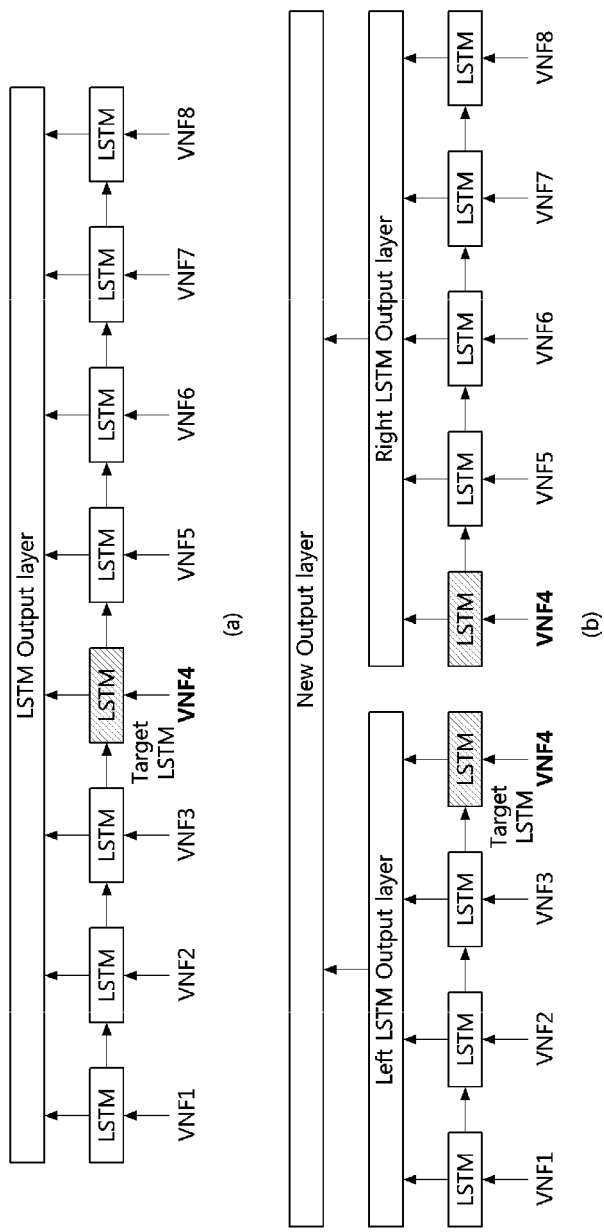
FIG. 5 shows block diagrams illustrating a long short-term memory (LSTM) and a target dependent LSTM according to an example embodiment of the present invention.

FIG. 5 shows block diagrams illustrating an LSTM and a target dependent LSTM according to an example embodiment of the present invention.

Referring to FIG. 5, the machine learning model used in the present invention may be a neural network model, which may be implemented using machine learning tools (e.g., Keras, Tensorflow, Pytorch, etc.). The neural network is a method of machine learning while input data passes through a neural layer like human nerves transmit signals. A method in which an LSTM, which is a type of RNN, is improved is used as the machine learning model. The RNN is one of neural network models and is a model that enables data to be learned while circulating inside a layer, rather than moving unidirectionally from one layer to another layer, like a feed forward neural network (FNN). A structure of such a model has an effect that each layer has a memory, which aids to utilize a relationship between pieces of data. That is, in a general neural network, pieces of input data are assumed to be independent. However, in an RNN, previously input data affects later input data, which results in more accurate learning results for pieces of data having a relationship. The LSTM has a form in which a cell state is added to a hidden state of the RNN, which is represented by Equation 1.

[Equation 1]

$$x = \begin{bmatrix} h_{t-1} \\ x_t \end{bmatrix}$$
$$f_t = \sigma(W_f \cdot X + b_f)$$
$$i_t = \sigma(W_i \cdot X + b_i)$$
$$o_t = \sigma(W_o \cdot X + b_o)$$
$$c_t = f_t \odot c_{t-1} + i_t \odot \tanh(W_c \cdot X + b_c)$$
$$h_t = o_t \odot \tanh(c_t)$$
$$W_i W_f W_o \in R^{d \times 2d}, b_i, b_f, b_o \in R^d$$

$\sigma$: Sigmoid function $\odot$: Hadamard product for elemental multiplication Referring to Equation 1, $W_i$, $W_f$, $W_o$, $W_i$, $W_f$, and $W_o$ and $b_i$, $b_f$, $b_o$, $b_i$, $b_f$, and $b_o$ are weight matrices and biases, respectively, and are parameter values of forget, input, output gates of the LSTM. Since the LSTM has the form as shown in Equation 1 above, when the RNN becomes far from a distance between the data used for the current machine learning and the data used for the previous machine learning, a problem (vanishing gradient problem) in which a back propagation gradient decreases may be addressed.

In the machine learning model proposed in the present invention, 100 dimensional values are allocated to the resource information of the VNFs provided as input values, and 100 hidden layers are allocated to the LSTM so that the result value also has 100 dimensional values. In the machine learning model, sizes of parameters used for the machine learning are changed correspondingly according to a size of a dimension. For example, in the machine learning model, the sizes of the parameters increase as the size of the dimension increases.

Referring to FIG. 1 again, the target dependent LSTM definition operation S3 is an operation of defining a target dependent LSTM model in which different types of data are input to the LSTM according to a target in order to address the problem of using the LSTM as the learning model of the present invention. The target dependent LSTM definition operation S3 will be described below in more detail with reference to FIG. 6.

Figure 6:
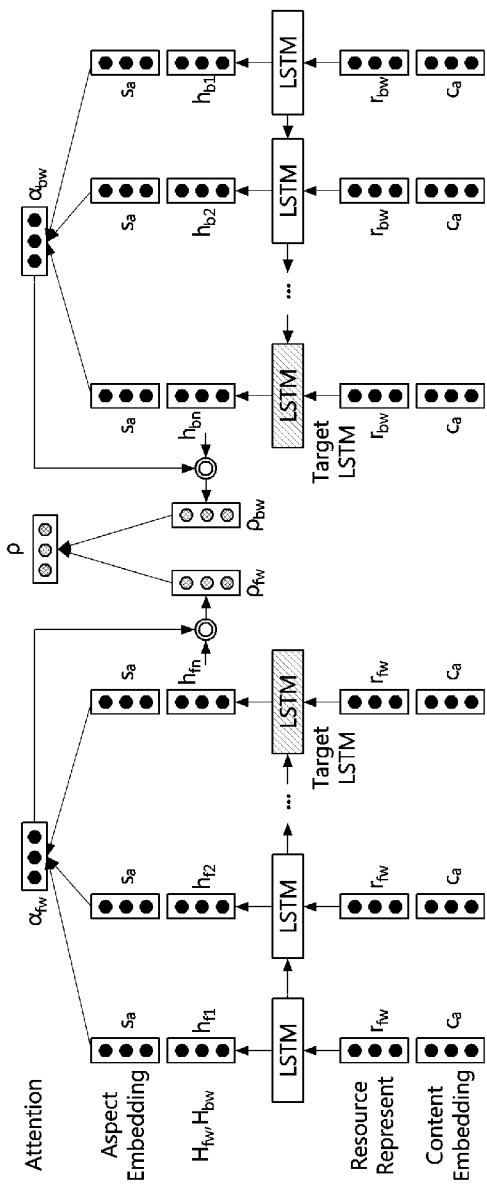
FIG. 6 is a diagram of a structure of a content and aspect embedding attentive target dependent LSTM (CAT-LSTM) according to an example embodiment of the present invention.

FIG. 6 is a diagram of a structure of a CAT-LSTM according to an example embodiment of the present invention.

Referring to FIG. 6, a target dependent LSTM model using attention, aspect, and content embedding technology is used as the machine learning model of the present invention. In the conventional method of predicting demand of VNF resources, a model predicts resource usage by learning resource data of each of the VNFs. For this reason, in the conventional method of predicting demand of the VNF resources, there is a disadvantage in that learning for predicting resource usage of an added VNF is additionally performed whenever a new VNF is added to the network.

Further, in the conventional method of predicting demand of the VNF resources, since the model learns using only the resources of the VNFs, there is a disadvantage in that, when the network state is changed, such as the case in which the configuration of the SFC is changed, the changed data should be collected and newly learned.

Meanwhile, in the machine learning model of the present invention, since the SFC as well as the resource data of the VNFs are used as the input data, it is possible to predict the resource usage of the network which is actually changing dynamically.

As in the related art, when the machine learning using SFC information is performed in units of individual VNFs, the labeling value corresponds to the entire feature data of the SFC, and thus there is a problem in that the machine learning about the relationship with the VNF to be targeted is relatively insufficient. Therefore, the machine learning according to the related art has a disadvantage in that performance is lowered. The above disadvantage will be described below in more detail with reference to FIG. 5 and Tables 2 to 4 below.

Table 2 shows examples of types of input values when the labeling value for the SFC is machine-learned.

TABLE 2

| Target | LSTM Input Value | Labeling |
|---|---|---|
| SFC1 | VNF1 VNF2 VNF3 VNF4 VNF5 VNF6 | Excess |
| SFC3 | VNF1 VNF5 VNF3 VNF6 VNF5 VNF2 | Proper |

Referring to Table 2, two different SFCs (SFC1 and SFC3) including six VNFs are used as input data of an LSTM. Such an example predicts resource usage for the entire SFC. The labeling value for the SFC is learned while searching for a relationship of input data features between the labeling value and the feature data without any problem.

Table 3 shows types of input values when different labeling values are learned for the same input data when using the LSTM.

TABLE 3

| Target | LSTM Input Value | Labeling |
|---|---|---|
| VNF3 | VNF1 VNF2 VNF3 VNF4 VNF5 VNF6 | Excess |
| VNF4 | VNF1 VNF2 VNF3 VNF4 VNF5 VNF6 | Proper |

In other words, Table 3 shows an example in which a general LSTM is used to address the problem of resource prediction of the VNF to be targeted in the SFC in the present invention. Unlike Table 2, the problem in Table 3 is that the resource prediction should be performed for one target VNF rather than the resource prediction of the entire SFC. In this case, since the target VNF is different but the input data used in the LSTM is the same, it is difficult to find a relationship between the labeling value and the feature data, which results in low accuracy.

Table 4 shows that labeling is learned for different types of data when input data is divided and learned as a target when using a TD-LSTM.

TABLE 4

| Target | Left LSTM Input Value | Right LSTM Input Value | Labeling |
|---|---|---|---|
| VNF3 | VNF1 VNF2 VNF3 | VNF6 VNF5 VNF4 VNF3 | Excess |
| VNF4 | VNF1 VNF2 VNF3 VNF4 | VNF6 VNF5 VNF4 | Proper |

Table 4 shows an example in which a problem caused by using a target dependent LSTM rather than a general LSTM is addressed. In this case, machine learning is performed with the same data, but different types of data are input to the LSTM according to the target. The input data is divided into two pieces of data based on a target VNF. Each of the divided pieces of data includes target data, and the divided data on a right side based on the target VNF is inputted with the data order reversed to the left and right as shown in Table 4.

That is, the data input to the right LSTM in Table 4 is originally VNF3, VNF4, VNF5, and VNF6, but the left and right inversion occurs, and the data is input in the form of VNF6, VNF5, VNF4, and VNF3. The method in which the VNF data is input to the LSTM is shown in detail in FIG. 5. FIG. 5A shows Table 3, FIG. 5B shows Table 4, and FIGS. 5A and 5B show a state in which the data is input to the target dependent LSTM.

In the conventional methods, the LSTM is used as shown in Table 2, and time series data of the VNF is used instead of using the SFC as data.

Meanwhile, the learning in units of VNFs is not appropriate in a dynamically changing network environment, and a learning process using SFC data is required. However, in case of using the conventional LSTM, since it is possible to predict only in units of SFCs as shown in Table 2 and it is impossible to predict in units of VNFs, the TD-LSTM is used as shown in Table 4 to address this problem.

The machine learning model proposed in the present invention may be represented by Equation 2 below and FIG. 6. The machine learning model may be implemented using Python 2 or Python 3 as a programming language and using Tensorflow, Keras, or Pytorch as a framework.

The target dependent LSTM is a method in which input data is divided based on an input value targeted in the conventional LSTM and a concatenation is done by self-learning two LSTMs. In the input data proposed in the present invention, pieces of resource information data of the VNFs are listed in the order in which a service is preset, as all the pieces of VNF resource information data in the SFC to which the target VNF belongs. The pieces of data are divided into two pieces of input data based on a position of the VNF to be labeled, and pieces of data truncated to the right from the reference data are used for the LSTM as the input values after left and right inversion. The pieces of input data are represented by $r_{fw}$ and $r_{bw}$ in Equation 2 and FIG. 6, left and right inversion is expressed as reverse in an expression (2) of Equation 2. In FIG. 6, it can be seen that a value of $S_a$ is added to the information of each VNF as the input value of the LSTM. Here, $S_a$ denotes the information of the SFC, and in addition, the information of the target VNF may be directly used. The output values of respective cells of the LSTM are defined as $H_{fw}$ and $H_{bw}$, and the values have the size of 200 dimensions with the addition of aspect embedding.

[Equation 2]

$$A_{fw} = \tanh\begin{bmatrix} W_{fw}H_{fw} \\ W_s s_a \circledast e_N \end{bmatrix} \quad (1)$$

$$A_{bw} = \tanh\left(\text{Reverse}\begin{bmatrix} W_{bw}H_{bw} \\ W_s s_a \circledast e_N \end{bmatrix}\right) \quad (2)$$

$$\alpha_{fw} = \text{softmax}(w_{fw}A_{fw}) \quad (3)$$

$$\alpha_{bw} = \text{softmax}(w_{bw}A_{bw}) \quad (4)$$

$$\rho = \begin{pmatrix} H_{fw}(\alpha_{fw})^T \\ H_{bw}(\alpha_{bw})^T \end{pmatrix} \quad (5)$$

$$h_f = \begin{pmatrix} h_{fn} \\ h_{bn} \end{pmatrix} \quad (6)$$

$$h^* = \tanh(W_q \rho + W_h h_F) \quad (7)$$

$$y = \text{softmax}(W_x h^* + b_x) \quad (8)$$

$$s_a \circledast e_N : [s; s; \ldots; s], \quad \text{Reverse}\begin{bmatrix} a \\ b \end{bmatrix} = \begin{bmatrix} b \\ a \end{bmatrix} \quad (9)$$

$A_{fw}, A_{bw} \in R^{(d \times d_s) \times N}, \alpha_{fw}, \alpha_{bw} \in R^N, \gamma \in R^{2d}$.

$W_{fw}, W_{bw}, W_s$: Attention parameters $W_q, W_h$: Learning parameters $W_{fx}, b_{xs}, w_{fw}, w_{bw}$: Softmax parameters $h_{fw}, h_{bw}$: last LSTM result value $$\text{loss} = -\sum_i \sum_j y_i^j \log \hat{y}_i^h + \lambda \|\theta\|^2 \quad (10)$$

Referring to FIGS. 1 and 6 again, the attention learning performed in the attention learning operation S4 is one of techniques used for machine learning and is an operation in which learning is performed by assigning attention parameters to important features while learning an entire feature data set.

The attention learning is a method of focusing on data that is directly related to learning results without paying attention to unnecessary data. In the present invention, several pieces of VNF resource data in the SFC are used to predict demand for resources of the VNF. In this case, since the attention is used to learn which VNF results are related to the resource prediction, the prediction accuracy may be increased by focusing on the resource data of the more relevant VNF.

For example, when $A_{fw}$ and $A_{bw}$ are obtained as in expressions (1) and (2) in Equation 2, the machine learning using attention parameter values $W_{fw}$, $W_{bw}$, and $W_s$ is performed. Expressions 3 and 4 in Equation 2 show that the final attention is obtained using a Softmax operation, and in an expression (5), ρ indicates applying the obtained attentions to the original hidden layer and performing concatenation thereof. The attention allows the model to relearn while giving high estimate values to the data that aids machine learning.

The aspect embedding use operation S5 is an operation of learning which VNF is closely related to the target VNF using aspect embedding during attention learning.

In the learning method using aspect embedding, the attention has an effect of learning an association between the target VNF and other surrounding VNFs as well as learning an association between resource prediction results and each VNF, and thus more improved prediction accuracy may be obtained. As described above, the purpose of adding aspect embedding to the attention is the same as the purpose of addressing the problem using the target dependent LSTM rather than the LSTM in the operation S3.

In this case, a dimension value of 100 is also used for the aspect embedding dimension. This is for assigning the same value to the parameter vector having the same size so that the result of the LSTM is the same as having a parameter vector having the size of 100 through 100 hidden layers. The dimension value of 100 may be sufficiently changed according to the configuration of various network environments.

Output values of the cells of the LSTM are defined as $H_{fw}$ and $H_{bw}$, and the aspect embedding is added to the values to have a total size of 200 dimensions. In Equation 2, expressions (1) and (2) represent such a state, and $e_N$ denotes a unit vector $[1, 1, 1, 1, \ldots, 1]$ having an aspect dimension size and $s_a \circledast e_N$ denotes $[s_a, s_a, s_a \ldots, s_a]^T$.

The content embedding use operation S6 is an operation of improving learning performance by additionally using the auxiliary data in addition to the main data when the resource information of the target VNF is predicted based on the resource information of the VNFs in the SFC.

The content embedding is the embedding of data that can be used additionally, such as previously known data or background data. In most cases, the content embedding results in high performance. In the content embedding according to the present invention, the resource information prediction of the target VNF is performed based on the resource information of the VNFs in the SFC. In this case, the type of the entire SFC, the SFC chain length, and the time series data are used additionally and subsidiarily in addition to the resource information of the VNF used as the main data and thus performance improvement may be obtained.

The content embedding according to the present invention is represented as shown in FIG. 6, and the VNFs of one SFC obtain the same content information by the content embedding. When the time series information of the VNF is used as the content embedding, the time series information of all the VNFs may be embedded in each piece of VNF resource information in the same way, or only one piece of information may be embedded differently one by one. In addition, in the content embedding according to the present invention, the aspect embedding may be used once more to improve the performance of the attention learning.

In other words, the content embedding serves to provide additional information and is defined as embedding one additional piece of information with the size of 100 dimensions by default. In this case, various pieces of additional information may be embedded, and the size of each dimension may also be sufficiently changed according to the configuration of the network environment. Like the VNF resource information, the reason why additional information is added to the content embedding without directly inputting information into the LSTM is because of the problem of a direction and size of data. When own resource information is predicted using the resource information of several surrounding VNFs, utilizing data using content embedding may provide better results when information such as types of SFC with slightly different data direction is input.

Referring to FIG. 1 again, the result value generation operation S7 is an operation of generating a final result value by combining a result value obtained by the attention with a result value obtained from the last LSTM cell among the result values of the resource prediction obtained using a series of learning processes.

The result value of the resource prediction obtained through the above-described operations S1 to S6 is not immediately used but is converted into a value of an expression (7) of Equation 2. Such a conversion operation may include performing an operation of machine learning by combining the result value obtained by the attention with the result value obtained from the last LSTM cell. The result value of the resource prediction obtained through the conversion operation has a higher accuracy than the result value obtained using only the attention or the LSTM.

This is because the attention compensates for not using time series information, that is, an information value about the distance between VNFs, unlike the LSTM so that the two learning results have complementary results.

In Equation 2, an expression (8) shows the case in which labelling is performed on the value obtained from an expression (7) by a Softmax operation. In this case, a Softmax parameter is used.

In Equation 2, an expression (10) is a loss function, which is a function expression for measuring the quality of the parameters showing how much high accuracy is attained when a score function (y value) obtained through various parameters is actually applied to the learning data so far. A cross-entropy expression is used in an expression (10) and L2 regularization is used to correct the result value.

The Adam optimizer is used for the optimization which is used to update a gradient value of the loss function and the learning rate is 0.01. The model is evaluated with 20 iterations for each step using 5 fold cross validation.

In the present invention, in order to predict VNF resource information, not only are the resources of the VNFs as data but also information of surrounding VNFs that are directly or indirectly related are used, and prediction is possible even in a dynamically changed network environment. In addition, service function chain (SFC) data among various pieces of network information is used to reduce a time required for machine learning according to a size of an entire network. In the present invention, in order to predict VNF resource information machine learning is used and a target dependent long short-term memory (LSTM) model among several machine learning models is used. Using such a model, machine learning in units of SFCs is possible instead of existing learning in units of VNFs. In addition, in the learning model according to the present invention, machine learning is performed based on attention so that main information can be selectively determined to perform the machine learning, attention learning is performed in terms of aspects using aspect embedding, and thus the machine learning is possible to set so as to focus on the target VNF.

In the present invention, SFC information is used to predict VNF resource information, not only the resource information of only one target VNF is used but also information of surrounding VNFs that are directly or indirectly related is considered, and thus a machine learning time can be reduced according to the size of the SFC and the size of the entire network.

Further, in the present invention, when machine learning is used to predict VNF resource information and a target dependent LSTM model among several machine learning models is used, the model can allow machine learning to be possible for one data object itself unlike conventional LSTMs that can only learn a predicted value for the entire data including multiple pieces of data, and thus it is possible to learn in units of SFCs.

Further, in the learning model proposed in the present invention, machine learning is performed based on attention so that main information can be selectively determined to perform the machine learning, attention learning is performed in terms of aspects using aspect embedding, and thus there is an advantage in that the machine learning can be set to focus on the target VNF.

Further, in the present invention, information on the known SFC and VNF types or time series state data is used by content embedding, and thus there is an advantage in that the learning model can obtain 10 to 20% higher accuracy than the existing learning model.

Further, in the present invention, a network administrator can perform functions such as VNF migration, VNF resource management, VNF deployment, and an SFC using machine learning, and thus overall network management can be automated.

While the exemplary embodiments of the present invention have been described in detail, the scope of the present invention is not limited thereto but may be implemented in various embodiments based on basic concepts of the present invention defined by the appended claims, and the embodiments are also within the scope of the present invention.

What is claimed is:

1. A method of predicting demand of resources of virtual network functions (VNFs) to which machine learning is applied, the method comprising:
    (a) a step of classifying and defining feature data representing features of data to be used for machine learning and applying a long short term memory (LSTM) as a model of the machine learning;
    (b) a step of learning by assigning attention parameters to important feature data while learning an entire feature data set using a target dependent LSTM model in which different types of data are input into the LSTM according to a target;
    (c) a step of learning which VNF is closely related to a target VNF using aspect embedding during attention learning;
    (d) a step of additionally using auxiliary data in addition to main data when resource information of the target VNF is predicted based on resource information of the VNFs in a service function chain (SFC); and
    (e) a step of generating a final result value by combining a result value obtained by attention with a result value obtained from a last LSTM cell, among result values of the resource prediction obtained using a series of learning processes,
    wherein the feature data in step (a) is classified into target data, VNF data, and content data.

2. The method of claim 1, wherein, in step (a), labeling data is further used as a classification criterion for the feature data.

3. The method of claim 1, wherein data to be used for the machine learning in step (a) includes one or more of entire VNF resource information of the SFC to which the target VNF belongs, the content data to be used as additional information, a unique number of the target VNF, and a labeling value.

4. The method of claim 1, wherein the LSTM in step (a) has a form in which a cell state is added to a hidden state.

5. The method of claim 1, wherein the model of the machine learning in step (a) uses resource data of the VNFs and the SFC as input data.

6. The method of claim 1, wherein the LSTM model in step (b) is the target dependent LSTM model using attention, aspect, and content embedding technology.

7. The method of claim 1, wherein, in order to define the target dependent LSTM model, step (b) includes:
- dividing the input data into two pieces of data based on the target VNF;
- learning the divided input data in each LSTM; and
- combining the learned data in the LSTM with each other.

8. The method of claim 1, wherein the auxiliary data in step (d) includes any one or more of a type of the entire SFC, an SFC chain length, and time series data.

9. The method of claim 1, wherein the final result value in step (e) is obtained by an operation of machine learning by combining the result value obtained by the attention and the result value obtained from the last LSTM cell.

\* \* \* \* \*